H. STEVENS.
Process for Preparing and Drying Glue.

No. 168,802.  Patented Oct. 11, 1875.

UNITED STATES PATENT OFFICE.

HENNELL STEVENS, OF BRAZORIA, TEXAS.

IMPROVEMENT IN PROCESSES FOR PREPARING AND DRYING GLUE.

Specification forming part of Letters Patent No. 168,802, dated October 11, 1875; application filed May 15, 1875.

*To all whom it may concern:*

Be it known that I, HENNELL STEVENS, of Brazoria, county of Brazoria and State of Texas, have invented an Improved Processes for Preparing and Drying Glue; and I do hereby declare that the following is a full, clear, and exact description thereof, reference being had to the accompanying drawings, making part of this specification, in which—

Figure 1:
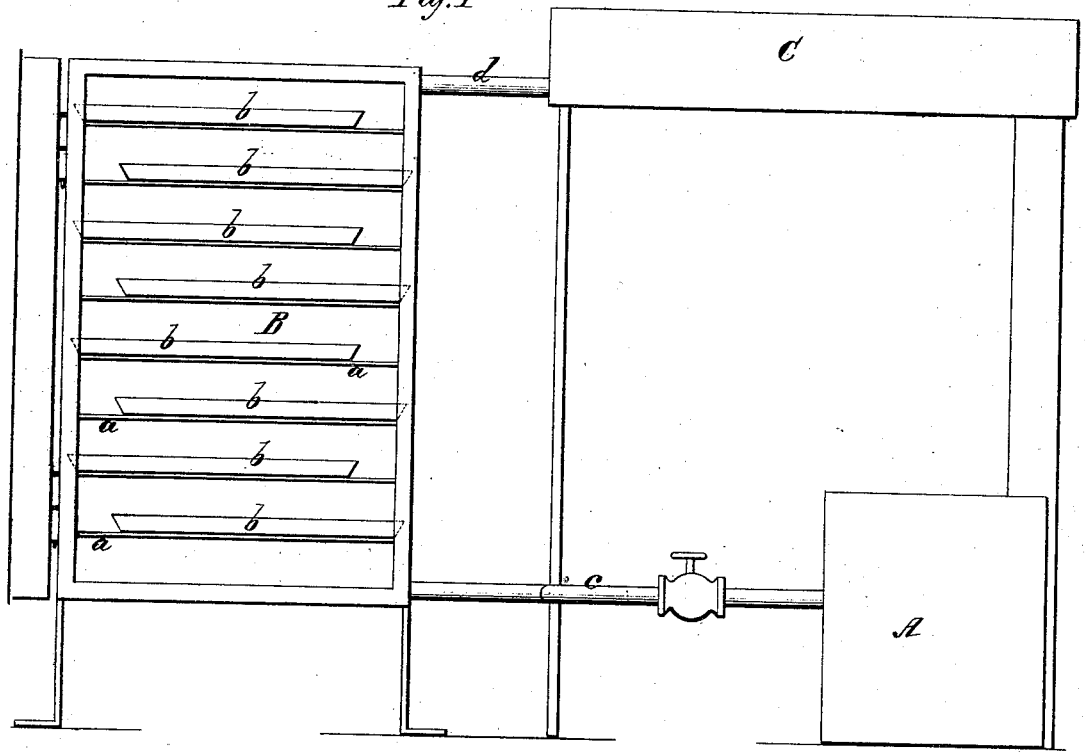
Figure 2:
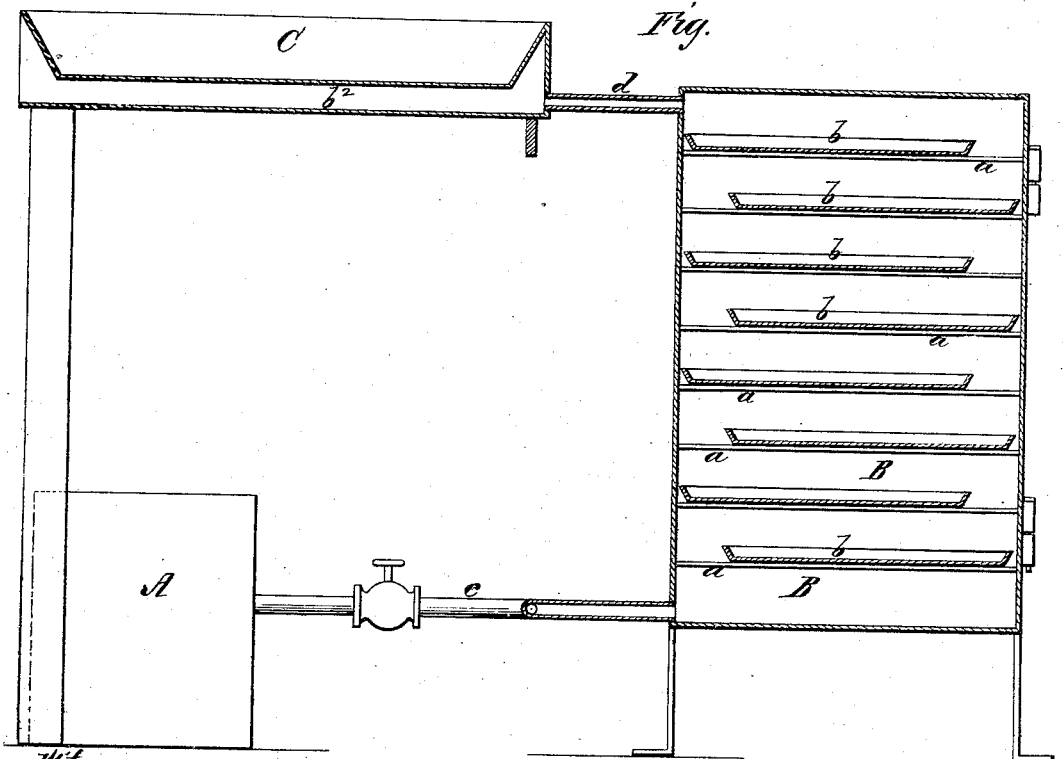

Figure 1 is a front elevation of the improved apparatus which I employ in carrying on my process; Fig. 2, a view, partly in section and partly in elevation, of the same apparatus.

The nature of my invention consists, first, in the process of drying glue by enveloping it in an atmosphere of superheated steam, the glue being placed in a drying-chamber connected with an apparatus which superheats the steam, and the steam allowed to expand therein.

It consists, second, in the combination of a glue-drying chamber and the apparatus which superheats and supplies the steam for drying the glue placed in said chamber.

It consists, third, in the combination of the glue-drying chamber, the apparatus for superheating the steam, and the apparatus which prepares the glue for drying.

To enable others skilled in the art to make and use my invention, I will proceed to describe one practical apparatus for carrying the same into effect.

A is the steam-superheater; B, the glue-drying chamber, and C the glue-preparing apparatus. The principal parts—A, B, and C—may be constructed, arranged, and combined in various ways, but the method I prefer, and which will produce the best results, is as follows:

Make a tight sheet-iron box, B—say, about four feet square and six feet high—with a tightly-fitting door opening the full length of one side. In the interior of this box place a series of iron rods, $a$, so as to support a number of shallow trays, $b$, of tin or other suitable material. These rods are placed about four inches apart. The trays are arranged to occupy the whole depth of the box, less the spaces between them, but not the whole width thereof. During the drying process the trays are alternately slipped to the right and left, so as to form serpentine passages for the superheated steam to pass through as it rises from the bottom to the top of the box. This insures the circulation of the superheated steam under the bottom and over the open tops of the trays before it passes off into the heater $b^2$ of the preparing-chamber. The superheater is connected to the drying-chamber by a pipe, $c$, and the drying-chamber is connected to the glue-preparing apparatus by a pipe, $d$, so that the drying is performed by the steam in its hottest condition, and the cost of the preparation of glue for drying is lessened by conducting the waste steam from the drying-chamber through the pipe $d$ to the heater of the preparing apparatus.

By my process and apparatus I obviate many difficulties heretofore experienced in the manufacture of glue.

In view of these difficulties I resorted to the use of superheated steam as a drying agent for the glue, and found that steam, when heated under pressure and allowed to expand, possesses a strong attraction for the moisture in the glue, it absorbing the moisture with avidity; and, notwithstanding that hygrometric materials, such as glue, part with their water reluctantly, and will not bear a high temperature in the hot air, the glue was not injured by the hot steam, for the reason, as I suppose, that as long as the glue contains moisture the evaporation prevents its attaining the temperature of the steam, and yet when placed in shallow pans and immersed or enveloped in an atmosphere of superheated steam of the pressure of the air it will part rapidly with its superfluous water, and soon reach a point at which it become solid, and can be broken ready for shipping after cooling it a few hours in the open air. Thus the expense for immense drying-rooms, and the necessary adjuncts, is avoided, and the manufacture greatly facilitated.

I do not claim superheated steam for drying lumber, or as a drying agent generally, as such steam has been used for drying lumber and some other substances.

What I claim as my invention, and desire to secure by Letters Patent, is—

1. The process of drying glue by enveloping it in superheated steam introduced into a chamber, substantially as and for the purpose described.

2. The combination of the superheating apparatus and the glue-drying chamber, substantially as and for the purpose set forth.

HENNELL STEVENS.

Witnesses:
N. H. STEVENS,
C. J. HINLEN.